US010938573B2

(12) United States Patent
Faye et al.

(10) Patent No.: US 10,938,573 B2
(45) Date of Patent: Mar. 2, 2021

(54) DISTRIBUTED TRANSACTION PROCESSING

(71) Applicant: Accenture Global Solutions Limited, Dublin (IE)

(72) Inventors: Abdoulaye Faye, Valbonne (FR); Laetitia Kameni, Antibes (FR)

(73) Assignee: Accenture Global Solutions Limited, Dublin (IE)

( * ) Notice: Subject to any disclaimer, the term of this patent is extended or adjusted under 35 U.S.C. 154(b) by 128 days.

(21) Appl. No.: 16/182,141

(22) Filed: Nov. 6, 2018

(65) Prior Publication Data

US 2020/0145225 A1 May 7, 2020

(51) Int. Cl.
*H04L 9/32* (2006.01)
*H04L 9/08* (2006.01)

(52) U.S. Cl.
CPC .......... *H04L 9/3247* (2013.01); *H04L 9/0866* (2013.01); *H04L 9/3263* (2013.01); *H04L 2209/38* (2013.01); *H04L 2209/56* (2013.01)

(58) Field of Classification Search
CPC ... H04L 9/3247; H04L 9/0866; H04L 9/3263; H04L 2209/38; H04L 2209/56; G06Q 20/3829; G06Q 50/01; G06Q 2220/00; G06Q 50/06; G06Q 30/06; G06Q 30/0201; G06Q 20/401; G06Q 20/382
See application file for complete search history.

(56) References Cited

U.S. PATENT DOCUMENTS

| 2013/0080385 | A1* | 3/2013 | Ho | G06Q 40/06 707/613 |
| 2015/0261563 | A1* | 9/2015 | Guerin | G06F 9/466 707/703 |
| 2015/0379510 | A1* | 12/2015 | Smith | H04L 9/3242 705/71 |
| 2016/0292680 | A1* | 10/2016 | Wilson, Jr. | G06Q 20/3678 |
| 2017/0078493 | A1* | 3/2017 | Melika | H04L 63/123 |
| 2017/0154331 | A1* | 6/2017 | Voorhees | H04L 67/20 |
| 2017/0337534 | A1* | 11/2017 | Goeringer | H04L 9/06 |
| 2017/0372300 | A1* | 12/2017 | Dunlevy | G06Q 20/36 |

(Continued)

OTHER PUBLICATIONS

Ip.com Search Query; May 15, 2020 (Year: 2020).*

(Continued)

*Primary Examiner* — Taghi T Arani
*Assistant Examiner* — Blake I Narramore
(74) *Attorney, Agent, or Firm* — Harrity & Harrity, LLP

(57) ABSTRACT

A transaction platform may provide access, to a distributed shared data structure, to a user device and a service provider device. The transaction platform may store, in the distributed shared data structure, user information associated with a user and service information associated with a service provider. The transaction platform may process a transaction between the user and the service provider by using a first set of processing nodes to generate a first transaction result and a second set of processing nodes is to generate a second transaction result. The transaction platform may determine whether the first transaction result and the second transaction result are the same, and may store, based on determining that the first transaction result and the second transaction result match, a smart contract, associated with the transaction, in a distributed ledger.

20 Claims, 10 Drawing Sheets

(56) References Cited

U.S. PATENT DOCUMENTS

| | | | | |
|---|---|---|---|---|
| 2018/0006831 | A1* | 1/2018 | Toll | G06Q 40/04 |
| 2018/0113752 | A1* | 4/2018 | Derbakova | G06Q 40/025 |
| 2018/0268401 | A1* | 9/2018 | Ortiz | G06Q 20/36 |
| 2019/0036702 | A1* | 1/2019 | Kano | G06Q 20/38 |
| 2019/0057362 | A1* | 2/2019 | Wright | G06Q 20/065 |
| 2019/0066065 | A1* | 2/2019 | Wright | G06Q 20/06 |
| 2019/0156336 | A1* | 5/2019 | Kasthuri | H04L 9/3236 |
| 2019/0156440 | A1* | 5/2019 | Wang | H04L 9/3297 |
| 2020/0074458 | A1* | 3/2020 | Govindarajan | G06Q 20/065 |
| 2020/0099524 | A1* | 3/2020 | Schiatti | H04L 9/3221 |
| 2020/0104712 | A1* | 4/2020 | Katz | G07F 17/329 |
| 2020/0134719 | A1* | 4/2020 | Malik | G06Q 20/3674 |

OTHER PUBLICATIONS

STIC Search; May 15, 2020 (Year: 2020).*
Ip.com Search Query; Oct. 30, 2020 (Year: 2020).*
Extended European Search Report for Application No. EP19206383. 2, dated Mar. 5, 2020, 10 pages.
EpigenCare, Apr. 13, 2018, 29 pages, https://www.epigencare.com/docs/epigencare_whitepaper.pdf.
Whitepaper, "ManeStreem: Beauty On-Demand—On Location Beauty & Wellness at the Tap of an App," May 15, 2018, 29 pages, https://www.manecoin.io/assets/Manestreem_Express%20Whitepaper_ManeStreem%20Express%20WhitePaper%20V5%20218-VIEW-7aca1245d2b12a61af83e6bd5db1d61eb8f6f489864635846e69e8f48f190895.pdf.
YouTube, "HireGo—Using the blockchain for P2P car hire," Feb. 17, 2018, 3 pages, https://www.youtube.com/watch?v=zMjywpYvrol.

* cited by examiner

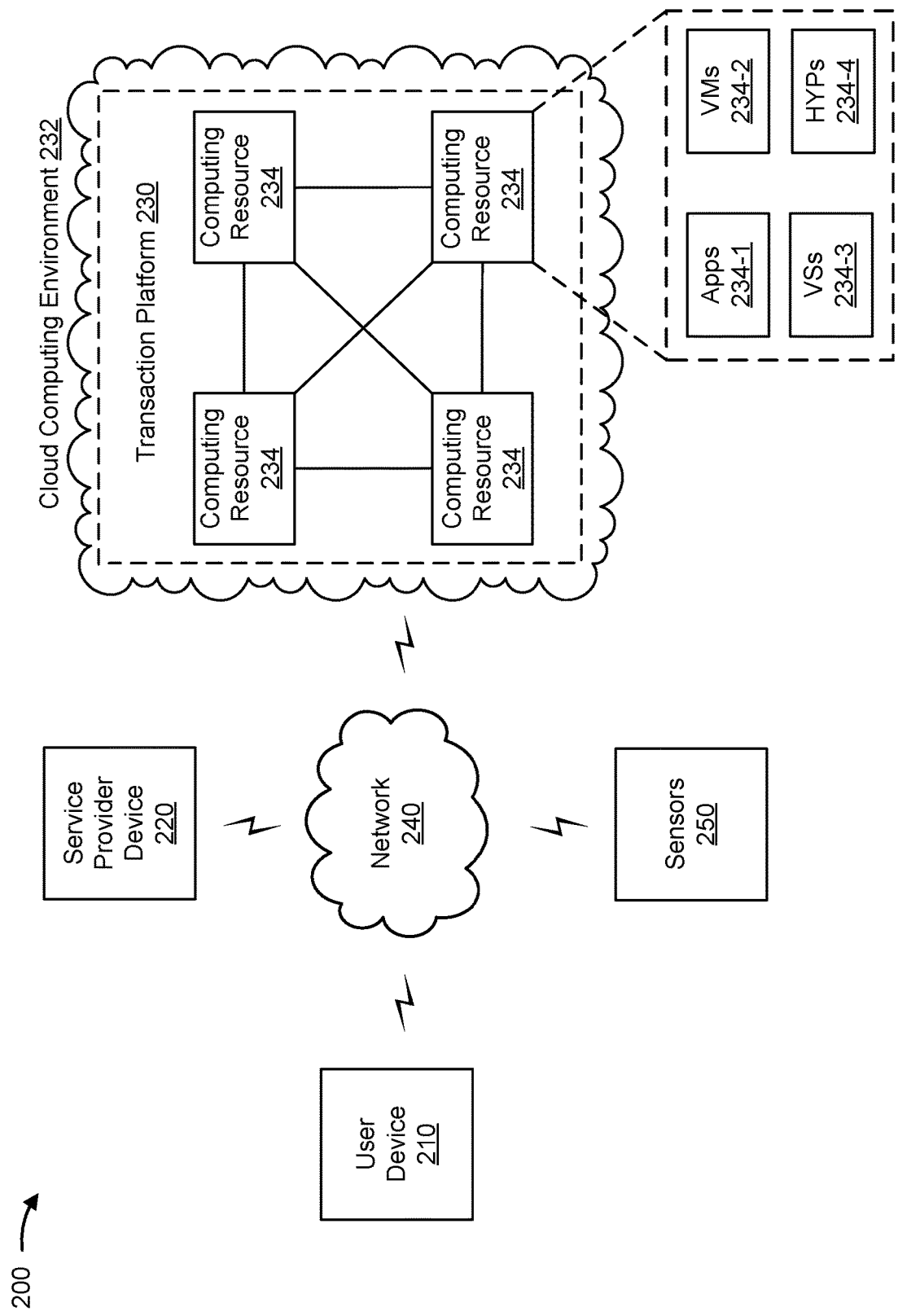

DISTRIBUTED TRANSACTION PROCESSING

BACKGROUND

A distributed ledger may comprise a data structure that stores information across a plurality of nodes. Examples of distributed ledgers include a private blockchain, a public blockchain, a federated blockchain, and/or the like.

SUMMARY

According to some implementations, a transaction platform may include one or more memories, and one or more processors, communicatively coupled to the one or more memories, to provide, to a user device, access to a distributed shared data structure, based on verifying a first multi-signature key associated with a user. The one or more processors may provide, to a service provider device, access to the distributed shared data structure, based on verifying a second multi-signature key associated with a service provider. The one or more processors may store, in the distributed shared data structure, user information associated with the user and service information associated with the service provider. The one or more processors may process, using a first set of processing nodes of the transaction platform and a second set of processing nodes of the transaction platform, a transaction between the user and the service provider, wherein the first set of processing nodes is to generate a first transaction result based on the user information and the service information, and wherein the second set of processing nodes is to generate a second transaction result based on the user information and the service information. The one or more processors may determine whether the first transaction result and the second transaction result are the same. The one or more processors may store, based on determining that the first transaction result and the second transaction result match, a smart contract, associated with the transaction, in a distributed ledger.

According to some implementations, a non-transitory computer-readable medium may store instructions that include one or more instructions that, when executed by one or more processors of a transaction platform, cause the one or more processors to provide, to a user device, access to a distributed shared data structure based on verifying a first multi-signature key associated with a user. The one or more instructions may cause the one or more processors to provide, to a service provider device, access to the distributed shared data structure based on verifying a second multi-signature key associated with a service provider. The one or more instructions may cause the one or more processors to store, in the distributed shared data structure, user information associated with the user, and service information associated with the service provider. The one or more instructions may cause the one or more processors to process, using a first set of processing nodes of the transaction platform and a second set of processing nodes of the transaction platform, a transaction between the user and the service provider, wherein the first set of processing nodes is to generate a first transaction result based on the user information and the service information, and wherein the second set of processing nodes is to generate a second transaction result based on the user information and the service information.

The one or more instructions may cause the one or more processors to determine whether the first transaction result and the second transaction result are the same. The one or more instructions may cause the one or more processors to store, based on determining that the first transaction result and the second transaction result match, a smart contract, associated with the transaction, in a distributed ledger. The one or more instructions may cause the one or more processors to update, based on the transaction between the user and the service provider, the user information stored in the distributed shared data structure.

According to some implementations, a method may include providing, by a transaction platform and to a user device, access to a distributed shared data structure based on verifying a first multi-signature key associated with a user. The method may include providing, by the transaction platform and to a service provider device, access to the distributed shared data structure based on verifying a second multi-signature key associated with a service provider. The method may include storing, by the transaction platform and in the distributed shared data structure, user information associated with the user, and service information associated with the service provider. The method may include processing, by the transaction platform and using a first set of processing nodes of the transaction platform and a second set of processing nodes of the transaction platform, a transaction between the user and the service provider, wherein the first set of processing nodes is to generate a first transaction result based on the user information and the service information, and wherein the second set of processing nodes is to generate a second transaction result based on the user information and the service information. The method may include determining, by the transaction platform, whether the first transaction result and the second transaction result are the same. The method may include storing, by the transaction platform and based on determining that the first transaction result and the second transaction result match, a smart contract, associated with the transaction, in a distributed ledger. The method may include updating, by the transaction platform and based on the transaction between the user and the service provider, at least one of the user information stored in the distributed shared data structure, or the service information stored in the distributed shared data structure.

BRIEF DESCRIPTION OF THE DRAWINGS

FIG. 2 is a diagram of an example environment in which systems and/or methods, described herein, may be implemented.

DETAILED DESCRIPTION

Figure 1A:
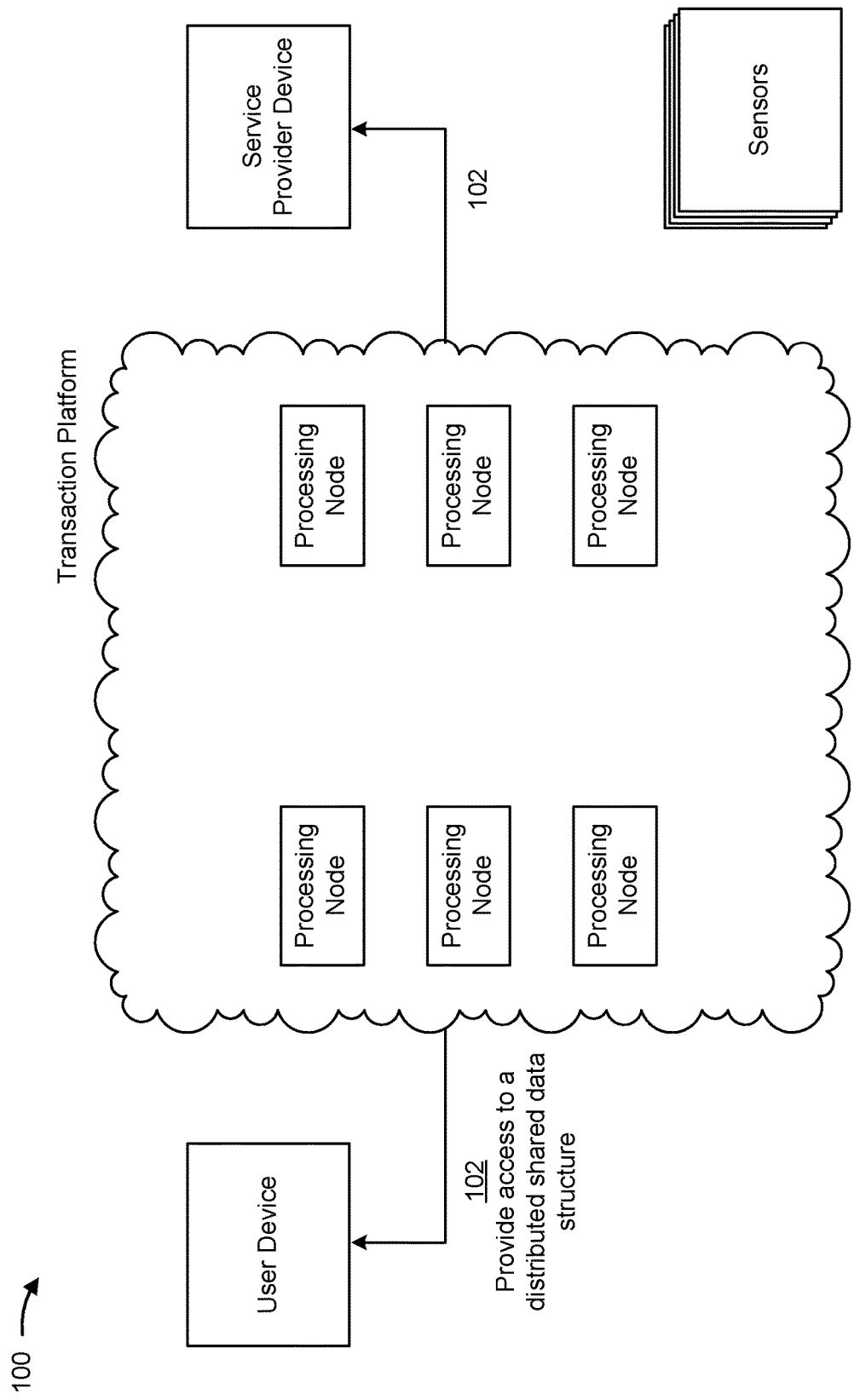
FIGS. 1A-1E are diagrams of an example implementation described herein.

The following detailed description of example implementations refers to the accompanying drawings. The same reference numbers in different drawings may identify the same or similar elements.

Transactions between users and service providers are being driven more and more by information (e.g., user information made available via social media content, information that is generated while a service is being provided to the user, and/or the like). As a result, there is an increasing risk of user and/or service provider information being tampered with, being corrupted, and/or being stolen.

Some implementations, described herein, provide a transaction platform that is capable of securing and ensuring the integrity of information associated with a transaction between a first entity and a second entity (e.g., a user and a service provider, a user and another user, and/or the like). The transaction platform offers an assurance of the accuracy and consistency of the information and the transaction by providing a first device, associated with a first entity, and a second device, associated with a second entity, with secure access to a distributed shared data structure, such that the first device may store information associated with the first entity, and the second device may store information associated with the second entity, in the distributed shared data structure. The transaction platform may process the transaction between the first entity and the second entity by using a first set of processing nodes to generate a first transaction result and a second set of processing nodes to generate a second transaction result based on the information. The transaction platform may determine whether the first transaction result and the second transaction result are the same, which may function as an indicator of whether the transaction has been tampered with, whether the user information and/or service provider information may have become corrupted or compromised, and/or the like. If the transaction platform determines that the first transaction result and the second transaction result are the same, the transaction platform may store a smart contract, associated with the transaction, in a distributed ledger.

In this way, the use of distributed sets of processing nodes to process the transaction, and the use of distributed ledger technology to store the smart contract, ensures integrity and security of the information and/or the transaction. Moreover, in this way, the use of distributed processing nodes to process the transaction allows the transaction platform to more efficiently distribute the processing and/or storage tasks associated with the transaction, which further allows the processing and/or storage tasks to be performed in parallel, which in turn reduces processing and/or storage times associated with the transaction. Further, the transaction platform is capable of customizing the transaction through the use of smart contract models, which allows the transaction platform to offer a more user-centric service experience, where information associated with the user is leveraged to offer a more personalized service.

FIGS. 1A-1E are diagrams of an example implementation 100 described herein. As shown in FIGS. 1A-1E, implementation may include a user device, a service provider device, one or more sensors, a transaction platform that includes a plurality of processing nodes, and/or the like. In some implementations, the user device may be associated with a user, and the service provider device and the sensors may be associated with a service provider. In some implementations, the transaction platform may process a transaction between the user and the service provider. The transaction may be associated with a service that is to be provided by the service provider to the user. However, in some implementations, the transaction may be associated with goods that are sold by a goods provider and/or any other type of transaction between two or more entities, such as transactions between a first user and a second user and transactions between a first business and a second business, and/or any other entities.

As shown in FIG. 1A, and by reference number 102, to process the transaction, the transaction platform may provide, to the user device and to the service provider device, access to a distributed shared data structure. The distributed data structure may include a database, as file system, one or more electronic files, and/or the like, that is implemented by the plurality of processing nodes of the transaction platform. In this way, information stored in the distributed shared data structure may be distributed among the plurality of processing nodes such that different portions of the information are stored on different processing nodes (e.g., such that each processing node, of the plurality of processing nodes, stores different information; such that two or more processing nodes, of the plurality of processing nodes, at least some of the same information; and/or the like).

In some implementations, the transaction platform may provide access to the distributed shared data structure based on verifying one or more credentials. For example, the transaction platform may provide the user device with access to the distributed shared data structured based on verifying the identity of the user, based on verifying a user name and password associated with the user, based on verifying a cryptographic key associated with the user, and/or the like. Similarly, the transaction platform may provide the service provider device with access to the distributed shared data structured based on verifying the identity of the service provider, based on verifying the identity of a representative of the service provider, based on verifying a user name and password associated with the service provider and/or representative, based on verifying a cryptographic key associated with the service provider and/or representative, and/or the like. In this way, any information and/or data that is stored in the distributed shared data structure is signed in a way that any operation (e.g., a read of the information and/or data from the distributed shared data structure, an access of the information and/or data in the distributed shared data structure, a write of information and/or data to the distributed shared data structure, and/or the like) will require an approval from each entity given access to the distributed shared data structure. This ensures that each particular entity retains total control of the information and/or data associated with the particular entity, while providing shared rights associated with the information and/or data.

In some implementations, the cryptographic key associated with the user may include a multi-signature key (e.g., a cryptographic key that is generated based on a combination of sources and/or pieces of information associated with the user). In some implementations, the transaction platform may generate the multi-signature key associated with the user, the user device may generate the multi-signature key associated with the user, a key-issuing authority may generate the multi-signature key associated with the user, and/or the like. For example, the multi-signature key, associated with the user, may be generated based on a private key associated with the user, a public key associated with the user, an electronic security certificate associated with the user (e.g., a secure sockets layer (SSL) certificate, a transport layer security (TLS) certificate, and/or the like), an identity associated with the user, one or more biometric inputs associated with the user (e.g., a retinal scan, a fingerprint, a voice sample, a facial scan, and/or the link), and/or the like. The multi-signature key, associated with the user, may be generated by using the combination of sources and/or pieces of information, associated with the user, in various key generation functions and/or algorithms, such as a data encryption standard (DES) algorithm, an advanced encryption standard (AES) algorithm, a Rivest-Shamir-Adleman (RSA) algorithm, and/or the like.

Similarly, the cryptographic key associated with the service provider may include a multi-signature key (e.g., a cryptographic key that is generated based on a combination of sources and/or pieces of information associated with the service provider and/or representative associated with the service provider). In some implementations, the transaction platform may generate the multi-signature key associated with the service provider, the service provider device may generate the multi-signature key associated with the service provider, a key-issuing authority may generate the multi-signature key associated with the service provider, and/or the like. For example, the multi-signature key, associated with the service provider, may be generated based on a private key associated with the service provider, a public key associated with the service provider, an electronic security certificate associated with the service provider (e.g., a secure sockets layer (SSL) certificate, a transport layer security (TLS) certificate, and/or the like), an identity associated with the service provider, and/or the like. The multi-signature key, associated with the service provider, may be generated by using the combination of sources and/or pieces of information, associated with the service provider, in various key generation functions and/or algorithms described above.

Once the transaction platform has verified the credentials of the user and the service provider, the transaction platform may provide the user device and the service provider device with access to the distributed shared data structure. To provide access to the distributed shared data structure, the transaction platform may provide, to the user device and the service provider device, an address associated with the distributed shared data structure (e.g., an Internet protocol version 4 (IPv4) address, an Internet protocol version 6 (IPv6) address, and/or the like), a port identifier associated with the distributed shared data structure (e.g., a port name, a port number, and/or the like), a uniform resource identifier (URI) associated with the distributed shared data structure, an application programming interface (API) associated with the distributed shared data structure (e.g., a representational state transfer (RESTful) API and/or another type of API), and/or the like.

Figure 1B:
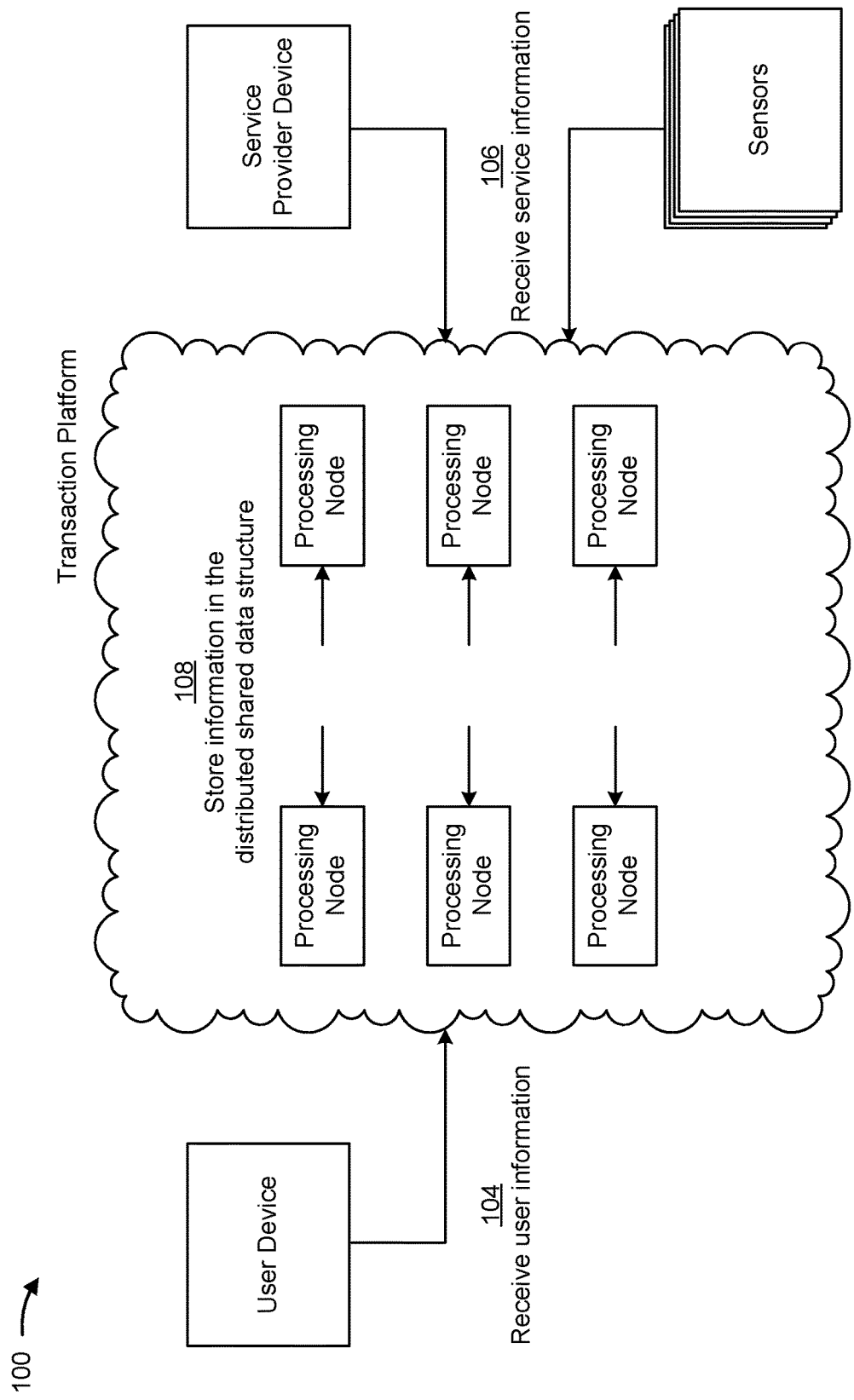

As shown in FIG. 1B, and by reference number 104, the transaction platform may receive user information, associated with the user, from the user device. The user device may provide the user information based on the transaction, between the user and the service provider, being initiated, may provide the user information based on the user device being provided with access to the distributed shared data store, may provide the user information based on the transaction platform requesting the user information from the user device, may provide the user information based on the user device being instructed (e.g., by the user) to provide the user information to the transaction platform, and/or the like. In some implementations, the user device may provide the user information prior to the service provider providing the service to the user, while the service provider is providing the service to the user, as a result of the service provider providing the service to the user, after the service provider has provided the service to the user, and/or the like.

In some implementations, the user information may include various types of information associated with the user. For example, the user information may include information identifying the user (e.g., the name of the user, biometric information associated with the user, and/or the like), contact information associated with the user (e.g., a mailing address of the user, an email address of the user, a phone number of the user, and/or the like), payment information associated with the user (e.g., credit card information, checking account information, and/or the like), one or more preferences, of the user, for the service that is to be provided to the user, and/or the like. The one or more preferences for the service may be based on a type of service that is to be provided to the user. For example, if the service is a rental car service (e.g., the user is to rent a vehicle from the service provider), the one or more preferences may include information identifying one or more preferred vehicle types (e.g., a make and/or model of a vehicle that the user prefers to rent), one or more preferred locations for the rental car service (e.g., a location at which the user prefers to pick up the vehicle to begin the rental car service, a location at which the user prefers to drop off the vehicle to conclude the rental car service, and/or the like), one or more radio station presets for the vehicle, one or more preferred gas stations to refuel the vehicle, one or more driver seat settings for the vehicle, one or more climate control settings for the vehicle, and/or the like. As another example, if the service is a lawn care service, the one or more preferences may include information identifying one or more scheduling preferences for the service (e.g., a time of day at which the user prefers to have the service provided, a day of the week and/or month on which the user prefers to have the service provided, and/or the like), one or more preferred types of lawn care services (e.g., the user may specify that the service provider is to mow the user's lawn and/or water the user's garden), and/or the like.

In some implementations, the user device may update the user information that was provided to the transaction platform. For example, if the contact information associated with the user changes, the user device may provide the updated contact information to the transaction platform. Similarly, if the one or more preferences for the service changes, the user device may provide the updated one or more preferences to the transaction platform.

As further shown in FIG. 1B, and by reference number 106, the service provider device and/or the one or more sensors may provide service provider information, associated with the service provider and/or the service that is to be provided to the user, to the transaction platform. The service provider device may provide the service provider information based on the transaction, between the user and the service provider, being initiated, may provide the service provider information based on the service provider device being provided with access to the distributed shared data store, may provide the service provider information based on the transaction platform requesting the service provider information from the service provider device, may provide the service provider information based on the service provider device being instructed (e.g., by the service provider) to provide the service provider information to the transaction platform, and/or the like. In some implementations, the service provider device may provide the service provider information prior to the service provider providing the service to the user, while the service provider is providing the service to the user, as a result of the service provider providing the service to the user, after the service provider has provided the service to the user, and/or the like.

In some implementations, the service provider information may include information identifying the service that is to be provided to the user, information identifying one or more parameters for the service, and/or the like. The one or more parameters for the service may include a start date and/or time at which the service is to be initiated, an end date and/or time at which the service is to be completed, pricing information for the service, and/or the like. In some implementations, the one or more parameters for the service may include one or more service-specific parameters. For example, if the service is a rental car service, the one or more parameters may include information identifying the vehicle that is to be used for the service (e.g., make of the vehicle, model of the vehicle, year of the vehicle, license plate number of the vehicle, vehicle identification number (VIN) of the vehicle, and/or the like). As another example, if the service is a hotel room rental, the one or more service-specific parameters may include information identifying a hotel room number, information identifying a hotel room type, and/or the like.

In some implementations, the service provider information may include data that is generated by the one or more sensors while the service is being provided to the user. For example, if the service is a rental car service, the one or more sensors may include a speedometer, associated with a vehicle, that generates speed information as the user drives the vehicle; may include an odometer that tracks the distance traveled by the vehicle; may include a fuel level sensor that tracks the fuel level of the vehicle. Moreover, the vehicle may be equipped with additional sensors that track breaking and/or acceleration habits of the user while driving the vehicle.

In some implementations, the one or more sensors may provide, to the service provider device, the data that is generated by the one or more sensors, and the service provider device may provide the data to the transaction platform. In some implementations, the transaction platform may provide the one or more sensors with access to the distributed shared data structure (e.g., based on verifying one or more credentials provided by the one or more sensors), and the one or more sensors may provide the data that is generated by the one or more sensors directly to the transaction platform. In some implementations, the one or more sensors may provide the data that is generated by the one or more sensors as the data is generated, may provide the data that is generated by the one or more sensors at periodic intervals, and/or the like.

As further shown in FIG. 1B, and by reference number 108, the transaction platform may receive the user information and the service provider information, and may store the user information and the service provider information in the distributed shared data structure. In some implementations, the user information and/or the service provider information stored in the distributed shared data structure may be distributed among the plurality of processing nodes such that different portions of the user information are stored on different processing nodes (e.g., such that each processing node, of the plurality of processing nodes, stores different portions of the user information; such that two or more processing nodes, of the plurality of processing nodes, at least some of the same portions of the user information; and/or the like). In some implementations, the user information and the service provider information stored in the distributed shared data structure may be distributed among the plurality of processing nodes such that the user information and the service provider information is redundantly stored by a first set of processing nodes of the plurality of processing nodes and a second set of processing nodes of the plurality of processing nodes (e.g., such that the first set of processing nodes stores a first copy of the user information and a first copy of the service provider information, and the second set of processing nodes stores a second copy of the user information and a second copy of the service provider information). In some implementations, the processing nodes that are included in the first set of processing nodes, and the processing nodes that are included in the second set of processing nodes, may be randomly selected; the processing nodes that are included in the first set of processing nodes may be selected by the user device (e.g., based on receiving, from the user device, an instruction to select that processing nodes that are included in the first set of processing nodes); the processing nodes that are included in the second set of processing nodes may be selected by the service provider device (e.g., based on receiving, from the service provider device, an instruction to select that processing nodes that are included in the second set of processing nodes); and/or the like. In this way, the user information and the service provider information may be stored in the distributed shared data structure in a decentralized manner while still providing some level of redundancy.

In some implementations, the transaction platform may store the user information on processing nodes that are different from the processing nodes on which the service provider information is stored, may store a portion of the user information on the same processing node as a portion of the service provider information, may store, on each processing node, a portion of the user information and a portion of the service provider information, and/or the like.

Figure 1C:
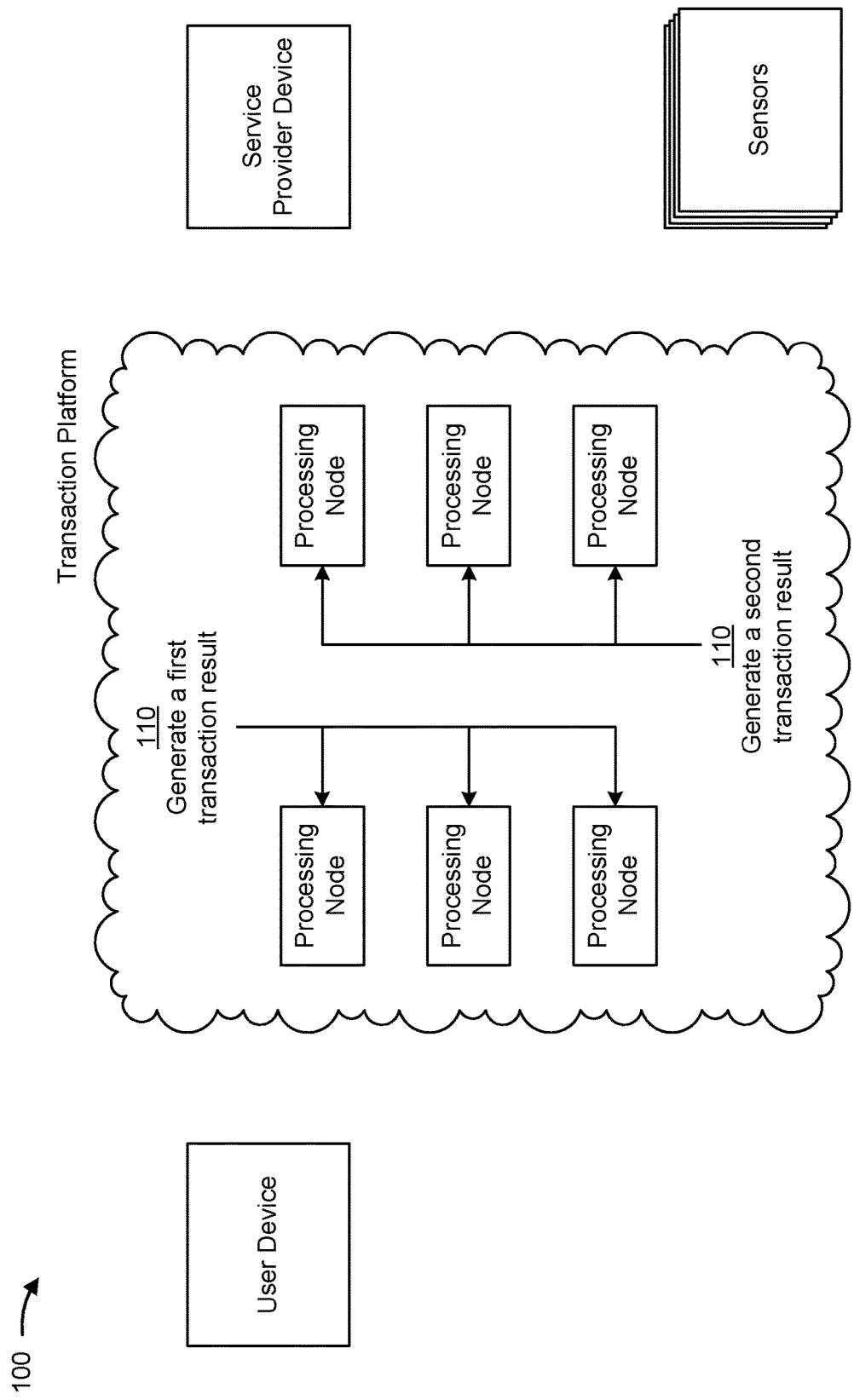

As shown in FIG. 1C, once the service provider has provided the service to the user, and all of the user information and the service provider information has been stored in the distributed shared data structure, the transaction platform may process the transaction for the completed service. As shown by reference number 110, to process the transaction, the transaction platform may generate, based on the user information and the service provider information stored in the distributed shared data structure, a plurality of transaction results using the plurality of processing nodes. For example, the transaction platform may use a first set of processing nodes, of the plurality of processing nodes, to generate a first transaction result, may use a second set of processing nodes, of the plurality of processing nodes, to generate a second transaction result, and so on.

In some implementations, a processing node, of the plurality of processing nodes, may be included in both the first set of processing nodes and the second set of processing nodes. In some implementations, to increase security in processing the transaction, the first set of processing nodes may include a mutually exclusive set of processing nodes relative to the second set of processing nodes (e.g., no processing node, included in the first set of processing nodes, is included in the second set of processing nodes, and vice versa). In this way, the first set of processing nodes does not have access to the processing of the second transaction result, and the second set of processing nodes does not have access to the processing of the first transaction result, which provides a firewall between the first set of processing nodes and the second set of processing nodes, which increases the security of the transaction. For example, if one or more processing nodes, of the first set of processing nodes, is attacked, corrupted, and/or otherwise compromised, the first transaction result may differ from the second transaction result as a result, which may be an indication that the one or more processing nodes have been compromised. Accordingly, the transaction platform may perform one or more actions to identify the source of the attack (e.g., performing one or more intrusion detection tests), may perform one or more actions to prevent the attack and/or corruption from affecting additional processing nodes (e.g., isolating the one or more processing nodes from other processing nodes), may perform one or more actions to resolve the corruption (e.g., rebooting the one or more processing nodes), and/or the like.

In some implementations, to generate the first transaction result, each processing node, of the first set of processing nodes, may generate an intermediate transaction result. For example, a respective processing node, of the first set of processing nodes, may generate an intermediate transaction result based on the one or more portions of user information and/or the one or more portions of service provider information stored by the respective processing node. The transaction platform may combine the intermediate transaction results to generate the first transaction result, may generate the first transaction result by applying the intermediate transaction results in an algorithm, and/or the like. Similarly, to generate the second transaction result, each processing node, of the second set of processing nodes, may generate an intermediate transaction result. For example, a respective processing node, of the second set of processing nodes, may generate an intermediate transaction result based on the one or more portions of user information and/or the one or more portions of service provider information stored by the respective processing node. The transaction platform may combine the intermediate transaction results to generate the second transaction result, may generate the second transaction result by applying the intermediate transaction results in an algorithm, and/or the like.

In some implementations, the first set of processing nodes may generate the first transaction result, and the second set of processing nodes may generate the second transaction result, based on a smart contract model. A smart contract may include an electronic contract that is implemented in a distributed ledger or a blockchain. A smart contract model may be associated with a particular service type (e.g., a rental car service, a real estate transaction service, a utility service, and/or the like), and may include a template for a smart contract that specifies one or more service-specific parameters, one or more user-specific parameters, and/or one or more service-provider-specific parameters for a particular type of service.

For example, a smart contract model associated with a rental car service may include one or more user-specific parameters that specify a daily rental rate modification associated with the user (e.g., a daily rental rate modification based on past driving behavior of the user), that specify an insurance rate modification associated with the user (e.g., based on an auto insurance history of the user), and/or the like. As another example, a smart contract model associated with a rental car service may include one or more service-specific parameters that specify a fee for returning a rented vehicle without refilling the fuel of the rented vehicle, that specify a daily rental rate modification for unsafe driving behavior while driving a rented vehicle (e.g., based on breaking and/or acceleration data that was generated by the one or more sensors), may specify a daily rental rate modification for whether the user elects to insure the rented vehicle, and/or the like. Accordingly, the transaction platform may determine the service type associated with the transaction between the user and the service provider (e.g., based on the user information, based on the service provider information, and/or the like), and may provide the smart contract model, associated with the service type, to the first set of processing nodes and the second set of processing nodes.

The first set of processing nodes may generate the first transaction result, and the second set of processing nodes may generate the second transaction result, by applying the one or more parameters, specified in the smart contract model, the user information and/or the service provider information stored in the distributed shared data structure.

The first transaction result and the second transaction result may include information identifying the user and the service provider, information identifying the service that was provided by the service provider to the user, information specifying a final transaction price for the provided service, information specifying one or more parameters, of the smart contract model, that affected the outcome of the transaction, and/or the like.

Figure 1D:
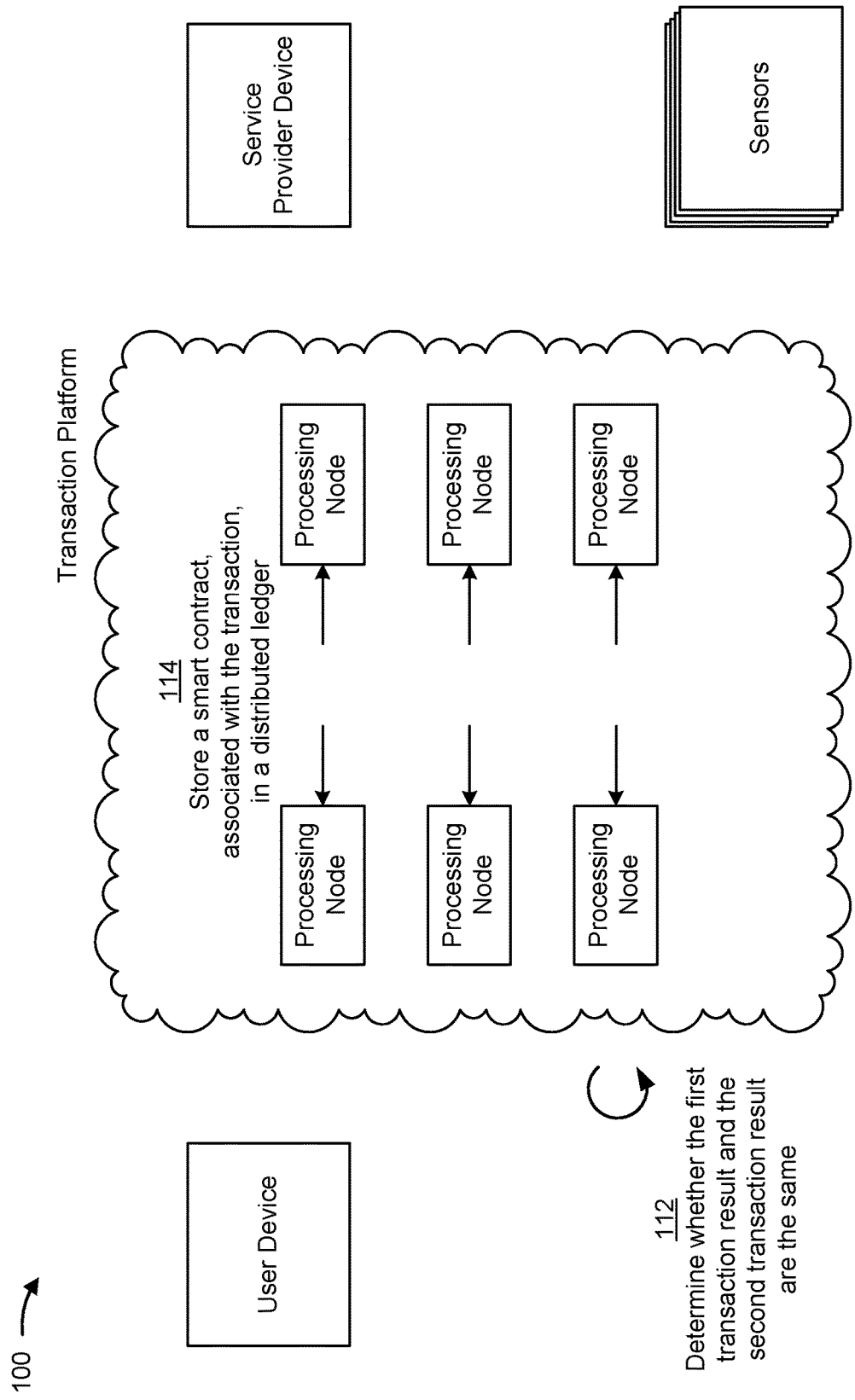

As shown in FIG. 1D, and by reference number 112, the transaction platform may determine whether the first transaction result, generated by the first set of processing nodes, and the second transaction result, generated by the second set of processing nodes, are the same (e.g., an exact match, a 99% match, and/or the like), and/or the like. For example, the transaction platform may compare the information, included in the first transaction result, identified above, and the information, included in the second transaction result, identified above, to determine whether the user and the service provider identified in the first transaction result and the second transaction result are the same, whether the final transaction price specified in the first transaction result and the second transaction result are the same, whether the one or more parameters, of the smart contract model, that affected the outcome of the transaction that are specified in the first transaction result and the second transaction result are the same, and/or the like.

In some implementations, if the transaction platform determines that the first transaction result and the second transaction result are not the same, the transaction platform may determine that one or more processing nodes of the first set of processing nodes and/or the second set of processing nodes has been attacked, corrupted, and/or otherwise compromised; may determine that the user information and/or the service provider information, stored in the distributed shared data structure, has been tampered with, corrupted, and/or otherwise compromised; and/or the like. Accordingly, the transaction platform may perform one or more actions to identify the source of the attack (e.g., performing one or more intrusion detection tests), may perform one or more actions to prevent the attack and/or corruption from affecting additional processing nodes (e.g., isolating the one or more processing nodes from other processing nodes), may perform one or more actions to resolve the corruption (e.g., rebooting the one or more processing nodes), and/or the like. After performing the one or more actions, the transaction platform may attempt to reprocess the transaction, may provide a request the user device, the service provider device, and/or the sensors to provide the user information and/or the service provider information to the transaction platform so that the transaction platform may reprocess the transaction and/or the like.

As further shown in FIG. 1D, and by reference number 114, if the transaction platform determines that the first transaction result and the second transaction result are the same, the transaction platform may store a smart contract, associated with the transaction, in a distributed ledger or blockchain hosted by the transaction platform using the plurality of processing nodes. The smart contract may function as a transcript and/or receipt of the processing of the transaction. For example, the smart contract may include the information included in the first transaction result and the second transaction result (e.g., information identifying the user and the service provider, information identifying the service that was provided by the service provider to the user, information specifying a final transaction price for the provided service, information specifying one or more parameters, of the smart contract model, that affected the outcome of the transaction, and/or the like). In some implementations, in addition to storing the smart contract in the distributed ledger or blockchain, the transaction platform may provide electronic copies of the smart contract to the user device and/or the service provider device, may provide, to the user device and/or the service provider device, an indication that the smart contract has been stored in the distributed ledger and/or blockchain, and/or the like.

Figure 1E:
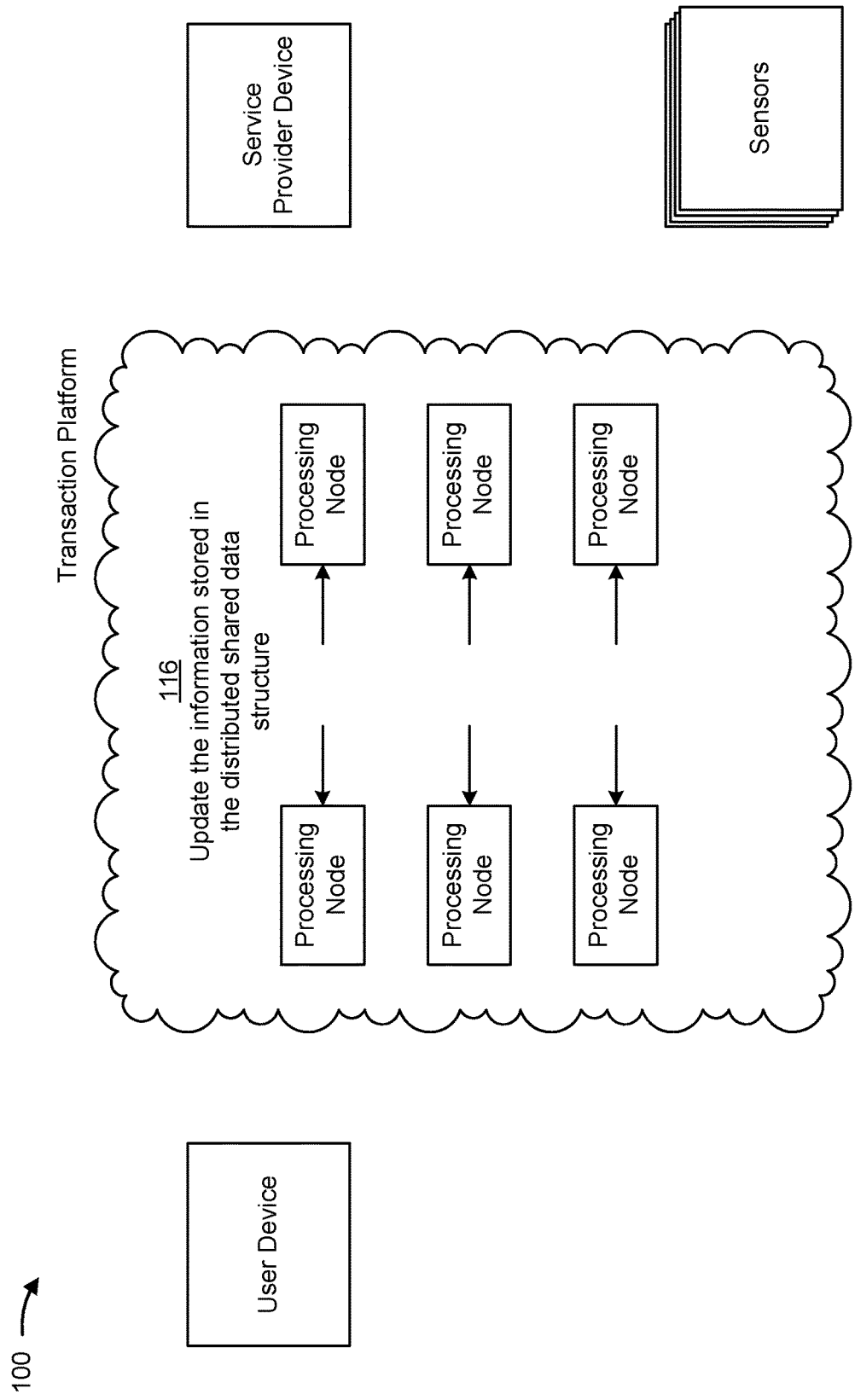

As shown in FIG. 1E, and by reference number 116, the transaction platform may update the user information and/or the service provider information, stored in the distributed shared data structure, based on the outcome of the transaction. For example, if the user device provided updated user preferences for the service, the transaction platform may update the user preferences stored in the distributed shared data structure such that the updated user preferences are used the next time the service is provided to the user. As another example, the transaction platform may store information, associated with the user, that may affect an outcome of a future transaction for the same service. For example, the transaction platform may store user behavior information associated with the service that was provided to the user such that the transaction platform may use the behavior information to modify one or more service-related parameters for the service (e.g., to offer the user higher or lower service rates, to offer the user rewards for desirable behavior associated with the service, and/or the like).

In this way, the transaction platform may use distributed sets of processing nodes to process a transaction between a user and a service provider, and the use of distributed ledger technology to store a smart contract associated with the transaction ensures integrity and security of the transaction and/or the information used in the transaction. Moreover, in this way, the use of distributed processing nodes to process the transaction allows the transaction platform to more efficiently distribute the processing and/or storage tasks associated with the transaction, which further allows the processing and/or storage tasks to be performed in parallel, which in turn reduces processing and/or storage times associated with the transaction. Further, the transaction platform is capable of customizing the transaction through the use of smart contract models, which allows the transaction platform to offer a more user-centric service experience, where information associated with the user is leveraged to offer a more personalized service.

As indicated above, FIGS. 1A-1E are provided merely as an example. Other examples are possible and may differ from what was described with regard to FIGS. 1A-1E.

FIG. 2 is a diagram of an example environment 200 in which systems and/or methods, described herein, may be implemented. As shown in FIG. 2, environment 200 may include a user device 210, a service provider device 220, a transaction platform 230 in a cloud computing environment 232 that includes a set of computing resources 234, a network 240, and one or more sensors 250. Devices of environment 200 may interconnect via wired connections, wireless connections, or a combination of wired and wireless connections.

User device 210 includes one or more devices capable of receiving, generating, storing, processing, and/or providing information associated with distributed transaction processing. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, user device 210 may be associated with a user and may provide, to transaction platform 230, user information associated with the user.

Service provider device 220 includes one or more devices capable of receiving, generating storing, processing, and/or providing information associated with distributed transaction processing. In some implementations, service provider device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, service provider device 220 may include mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, service provider device 220 may include a communication interface that allows service provider device 220 to receive information from and/or transmit information to other devices in environment 200. In some implementations, service provider device 220 may be a physical device implemented within a housing, such as a chassis. In some implementations, service provider device 220 may be a virtual device implemented by one or more computer devices of a cloud computing environment or a data center. In some implementations, service provider device 220 may be associated with a service provider that is to provide a service to the user associated with user device 210. In some implementations, service provider device 220 may provide service information, associated with the service provider and/or the service, to transaction platform 230.

Transaction platform 230 includes one or more devices capable of receiving, generating, storing, processing, and/or providing information associated with distributed transaction processing. For example, transaction platform 230 may receive the user information from user device 210, may receive the service provider information from service provider device 220, and may process, based on the user information and the service provider information, a transaction between the user associated with user device 210 and the service provider associated with service provider device 220. In some implementations, transaction platform 230 may process the transaction using a plurality of processing nodes, which may be implemented by computing resources 234. For example, transaction platform 230 may use a first set of processing nodes to process a first transaction result, and may use a second set of processing nodes to process a second transaction result. Transaction platform 230 may compare the first transaction result and the second transaction result to determine whether the first transaction result and the second transaction result are the same. Transaction platform 230 may store, based on determining that the first transaction result and the second transaction result are the same, a smart contract, associated with the transaction, in a distributed ledger or blockchain hosted by the plurality or processing nodes.

In some implementations, as shown, transaction platform 230 may be hosted in cloud computing environment 232. Notably, while implementations described herein describe transaction platform 230 as being hosted in cloud computing environment 232, in some implementations, transaction platform 230 may not be cloud-based (i.e., may be implemented outside of a cloud computing environment) or may be partially cloud-based.

Cloud computing environment 232 includes an environment that hosts transaction platform 230. Cloud computing environment 232 may provide computation, software, data access, storage, and/or other services. As shown, cloud computing environment 232 may include a group of computing resources 234 (referred to collectively as "computing resources 234" and individually as "computing resource 234"), which may also be referred to as processing nodes.

Computing resource 234 includes one or more personal computers, workstation computers, server devices, or another type of computation and/or communication device. In some implementations, computing resource 234 may host transaction platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with transaction platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210, a user of service provider device 220, and/or the like), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Sensors 250 include one or more physical and/or virtual sensors that are capable of sensing, collecting, generating, storing, processing, and/or providing information associated with distributed transaction processing. For example, sensors 250 may include a speedometer, an odometer, a fuel level sensor, an occupancy sensor, and/or the like. In some implementations, sensors 250 may be associated with the service provider, and may generate data associated with a service that is provided by the service provider to the user. In some implementations, sensors 250 may provide the generated data directly to transaction platform 230, may provide the generated data to service provider device 220 which may provide the generated data to transaction platform 230, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
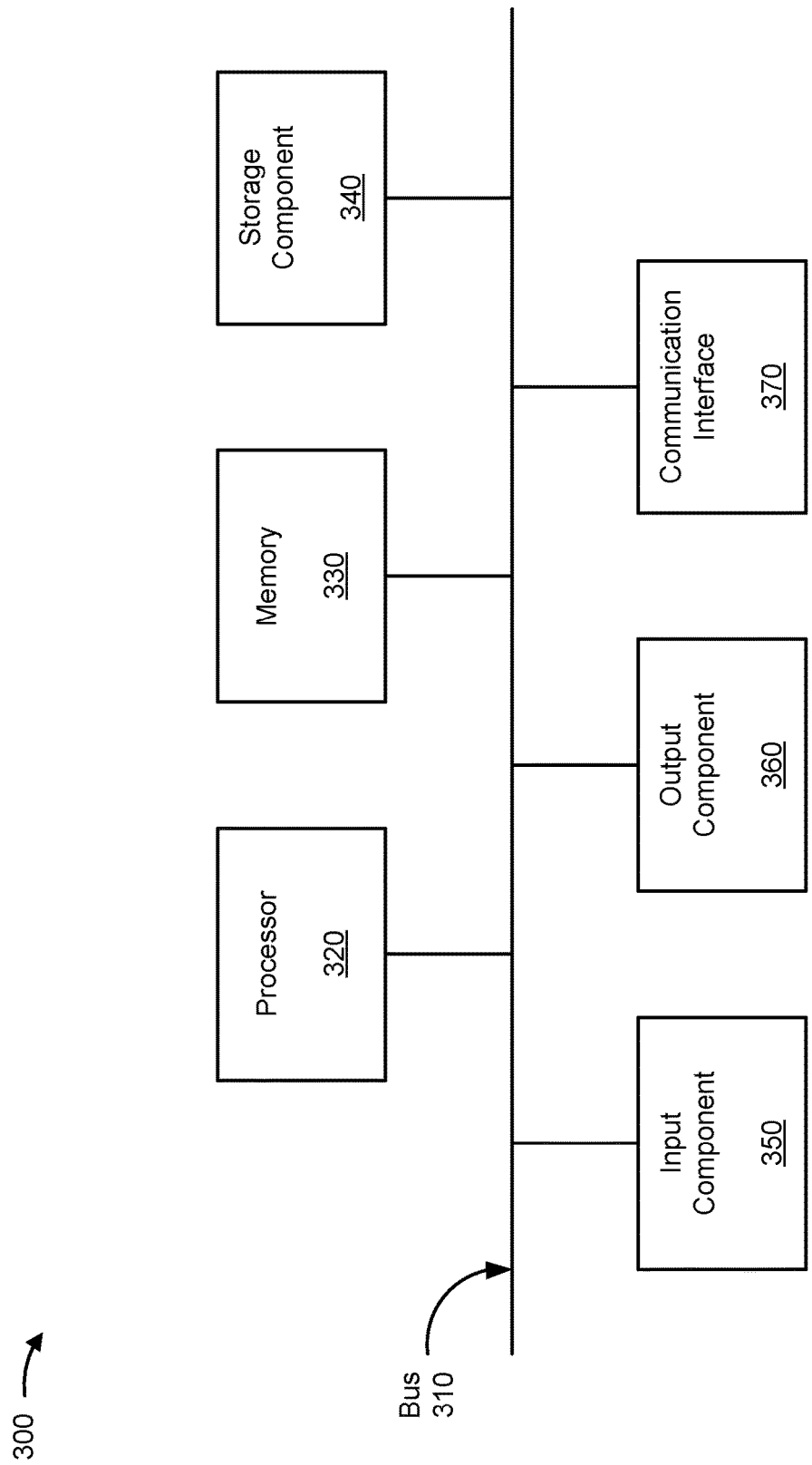
FIG. 3 is a diagram of example components of one or more devices of FIG. 2.

FIG. 3 is a diagram of example components of a device 300. Device 300 may correspond to user device 210, service provider device 220, transaction platform 230, computing resource 234, and/or sensors 250. In some implementations, user device 210, service provider device 220, transaction platform 230, computing resource 234, and/or sensors 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
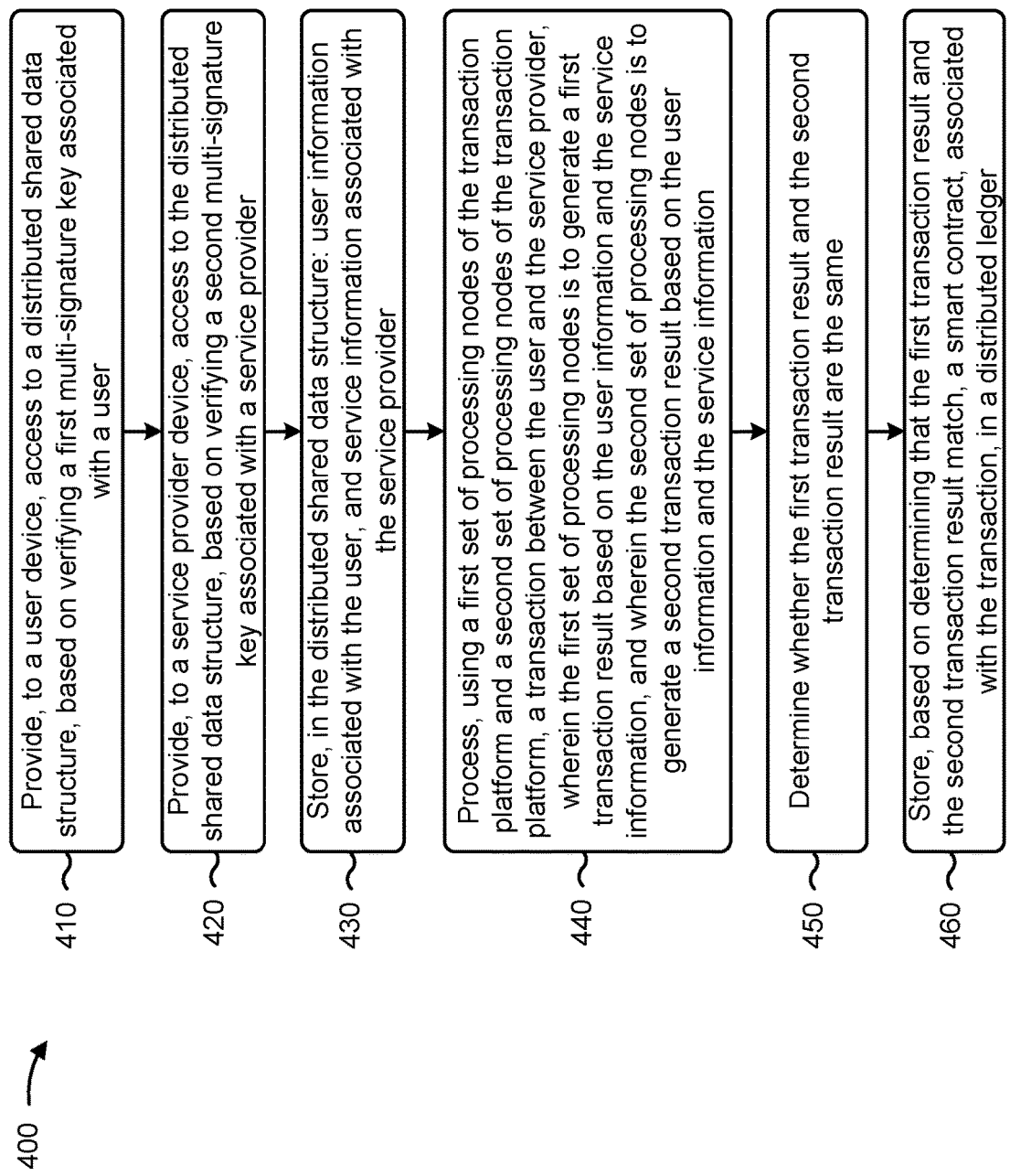
FIG. 4 is a flow chart of an example process for distributed transaction processing.

FIG. 4 is a flow chart of an example process 400 for distributed transaction processing. In some implementations, one or more process blocks of FIG. 4 may be performed by a transaction platform (e.g., transaction platform 230). In some implementations, one or more process blocks of FIG. 4 may be performed by another device or a group of devices separate from or including the transaction platform, such as a user device (e.g., user device 210), a service provider device (e.g., service provider device 220), one or more sensors (e.g., sensors 250), and/or the like.

As shown in FIG. 4, process 400 may include providing, to a user device, access to a distributed shared data structure, based on verifying a first multi-signature key associated with a user (block 410). For example, the transaction platform (e.g., using computing resource 234, processor 320, memory 330, storage component 340, input component 350, output component 360, communication interface 370, and/or the like) may provide, to a user device, access to a distributed shared data structure, based on verifying a first multi-signature key associated with a user, as described above.

As shown in FIG. 4, process 400 may include providing, to a service provider device, access to the distributed shared data structure, based on verifying a second multi-signature key associated with a service provider (block 420). For example, the transaction platform (e.g., using computing resource 234, processor 320, memory 330, storage component 340, input component 350, output component 360, communication interface 370, and/or the like) may provide, to a service provider device, access to the distributed shared data structure, based on verifying a second multi-signature key associated with a service provider, as described above.

As shown in FIG. 4, process 400 may include storing, in the distributed shared data structure, user information associated with the user, and service information associated with the service provider (block 430). For example, the transaction platform (e.g., using computing resource 234, processor 320, memory 330, storage component 340, input component 350, output component 360, communication interface 370, and/or the like) may store, in the distributed shared data structure, user information associated with the user, and service information associated with the service provider, as described above.

As shown in FIG. 4, process 400 may include processing, using a first set of processing nodes of the transaction platform and a second set of processing nodes of the transaction platform, a transaction between the user and the service provider, wherein the first set of processing nodes is to generate a first transaction result based on the user information and the service information, and wherein the second set of processing nodes is to generate a second transaction result based on the user information and the service information (block 440). For example, the transaction platform (e.g., using computing resource 234, processor 320, memory 330, storage component 340, input component 350, output component 360, communication interface 370, and/or the like) may process, using a first set of processing nodes of the transaction platform and a second set of processing nodes of the transaction platform, a transaction between the user and the service provider, as described above. In some implementations, the first set of processing nodes is to generate a first transaction result based on the user information and the service information. In some implementations, the second set of processing nodes is to generate a second transaction result based on the user information and the service information.

As shown in FIG. 4, process 400 may include determining whether the first transaction result and the second transaction result are the same (block 450). For example, the transaction platform (e.g., using computing resource 234, processor 320, memory 330, storage component 340, input component 350, output component 360, communication interface 370, and/or the like) may determine whether the first transaction result and the second transaction result are the same, as described above.

As shown in FIG. 4, process 400 may include storing, based on determining that the first transaction result and the second transaction result match, a smart contract, associated with the transaction, in a distributed ledger (block 460). For example, the transaction platform (e.g., using computing resource 234, processor 320, memory 330, storage component 340, input component 350, output component 360, communication interface 370, and/or the like) may store, based on determining that the first transaction result and the second transaction result match, a smart contract, associated with the transaction, in a distributed ledger, as described above.

Process 400 may include additional implementations, such as any single implementation or any combination of implementations described below and/or in connection with one or more other processes described elsewhere herein.

In some implementations, the first set of processing nodes comprises a mutually exclusive set of processing nodes relative to the second set of processing nodes. In some implementations, the first set of processing nodes is to generate the first transaction result based on a smart contract model, and the second set of processing nodes is to generate the second transaction result based on the smart contract model. In some implementations, the first multi-signature key is generated based on a first cryptographic identity associated with the user and a first private key associated with the user, and the second multi-signature key is generated based on a second cryptographic identity associated with the service provider and a second private key associated with the service provider.

In some implementations, the transaction platform may receive the service information from one or more sensors that are associated with a service that is to be provided, by the service provider, to the user. In some implementations, when processing the transaction between the user and the service provider, the transaction platform may randomly select the first set of processing nodes and the second set of processing nodes from a plurality of processing nodes of the transaction platform. In some implementations, when processing the transaction between the user and the service provider, the transaction platform may receive, from the user device, a first instruction to select the first set of processing nodes from a plurality of processing nodes of the transaction platform, and may receive, from the service provider device, a second instruction to select the second set of processing nodes from the plurality of processing nodes of the transaction platform.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
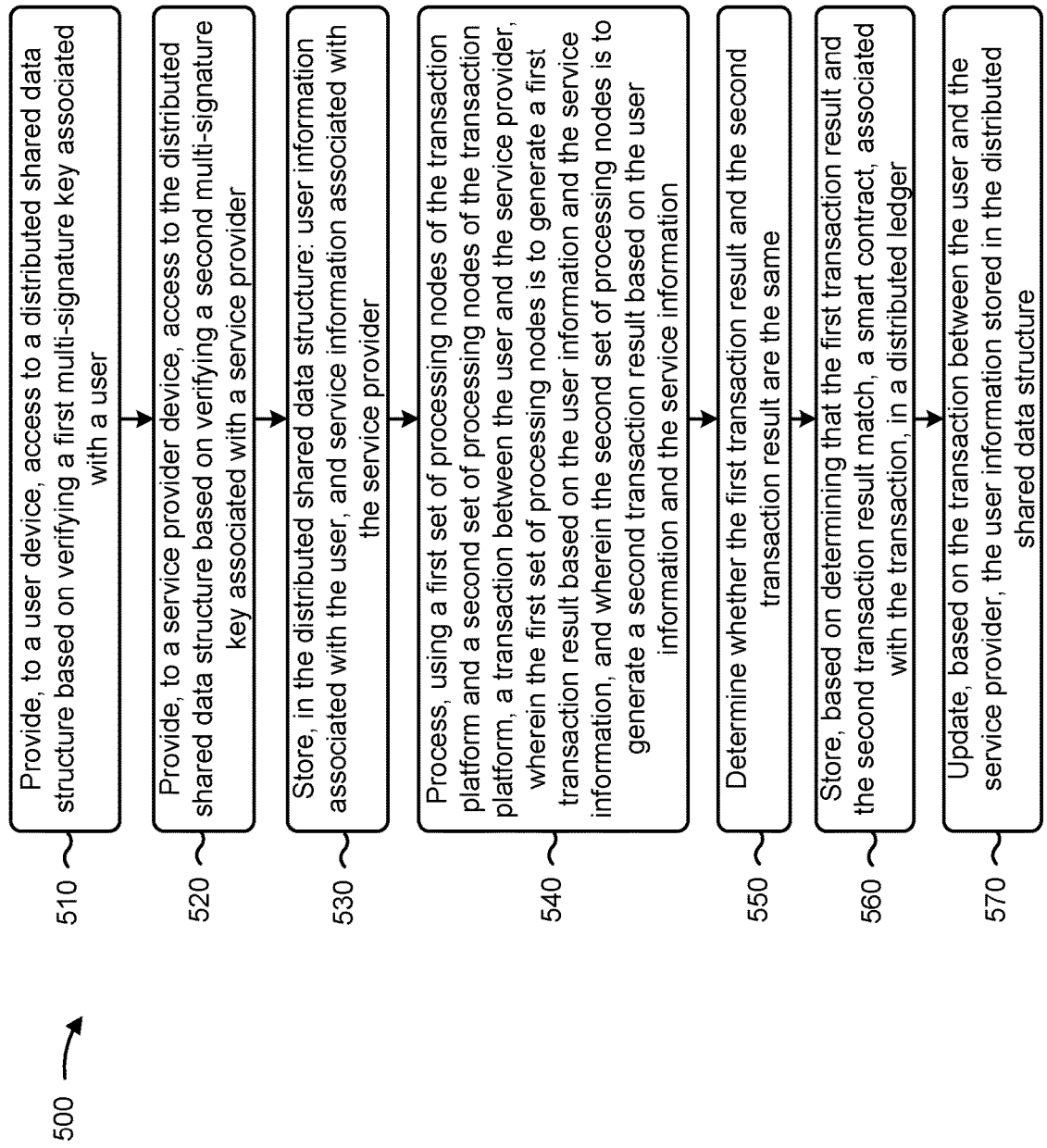
FIG. 5 is a flow chart of an example process for distributed transaction processing.

FIG. 5 is a flow chart of an example process 500 for distributed transaction processing. In some implementations, one or more process blocks of FIG. 5 may be performed by a transaction platform (e.g., transaction platform 230). In some implementations, one or more process blocks of FIG. 5 may be performed by another device or a group of devices separate from or including the transaction platform, such as a user device (e.g., user device 210), a service provider device (e.g., service provider device 220), one or more sensors (e.g., sensors 250), and/or the like.

As shown in FIG. 5, process 500 may include providing, to a user device, access to a distributed shared data structure, based on verifying a first multi-signature key associated with a user (block 510). For example, the transaction platform (e.g., using computing resource 234, processor 320, memory 330, storage component 340, input component 350, output component 360, communication interface 370, and/or the like) may provide, to a user device, access to a distributed shared data structure, based on verifying a first multi-signature key associated with a user, as described above.

As shown in FIG. 5, process 500 may include providing, to a service provider device, access to the distributed shared data structure, based on verifying a second multi-signature key associated with a service provider (block 520). For example, the transaction platform (e.g., using computing resource 234, processor 320, memory 330, storage component 340, input component 350, output component 360, communication interface 370, and/or the like) may provide, to a service provider device, access to the distributed shared data structure, based on verifying a second multi-signature key associated with a service provider, as described above.

As shown in FIG. 5, process 500 may include storing, in the distributed shared data structure, user information associated with the user, and service information associated with the service provider (block 530). For example, the transaction platform (e.g., using computing resource 234, processor 320, memory 330, storage component 340, input component 350, output component 360, communication interface 370, and/or the like) may store, in the distributed shared data structure, user information associated with the user, and service information associated with the service provider, as described above.

As shown in FIG. 5, process 500 may include processing, using a first set of processing nodes of the transaction platform and a second set of processing nodes of the transaction platform, a transaction between the user and the service provider, wherein the first set of processing nodes is to generate a first transaction result based on the user information and the service information, and wherein the second set of processing nodes is to generate a second transaction result based on the user information and the service information (block 540). For example, the transaction platform (e.g., using computing resource 234, processor 320, memory 330, storage component 340, input component 350, output component 360, communication interface 370, and/or the like) may process, using a first set of processing nodes of the transaction platform and a second set of processing nodes of the transaction platform, a transaction between the user and the service provider, as described above. In some implementations, the first set of processing nodes is to generate a first transaction result based on the user information and the service information. In some implementations, the second set of processing nodes is to generate a second transaction result based on the user information and the service information.

As shown in FIG. 5, process 500 may include determining whether the first transaction result and the second transaction result are the same (block 550). For example, the transaction platform (e.g., using computing resource 234, processor 320, memory 330, storage component 340, input component 350, output component 360, communication interface 370, and/or the like) may determine whether the first transaction result and the second transaction result are the same, as described above.

As shown in FIG. 5, process 500 may include storing, based on determining that the first transaction result and the second transaction result match, a smart contract, associated with the transaction, in a distributed ledger (block 560). For example, the transaction platform (e.g., using computing resource 234, processor 320, memory 330, storage component 340, input component 350, output component 360, communication interface 370, and/or the like) may store, based on determining that the first transaction result and the second transaction result match, a smart contract, associated with the transaction, in a distributed ledger, as described above.

As shown in FIG. 5, process 500 may include updating, based on the transaction between the user and the service provider, the user information stored in the distributed shared data structure (block 570). For example, the transaction platform (e.g., using computing resource 234, processor 320, memory 330, storage component 340, input component 350, output component 360, communication interface 370, and/or the like) may update, based on the transaction between the user and the service provider, the user information stored in the distributed shared data structure, as described above.

Process 500 may include additional implementations, such as any single implementation or any combination of implementations described below and/or in connection with one or more other processes described elsewhere herein.

In some implementations, the user information comprises at least one of information identifying an identity of the user, or information identifying one or more preferences, associated with the user, for a service provided by the service provider. In some implementations, when updating the user information stored in the distributed shared data structure, the transaction platform may update the information identifying the one or more preferences, associated with the user, for the service provided by the service provider. In some implementations, the service information comprises at least one of information identifying a service, associated with the transaction between the user and the service provider, that is to be provided to the user, information identifying one or more parameters for the service, or data that is generated while the service is being provided to the user.

In some implementations, the transaction platform may update, based on the transaction between the user and the service provider, the service information stored in the distributed shared data structure. In some implementations, the first set of processing nodes is to generate the first transaction result based on one or more parameters specified in a smart contract model that is associated with the transaction between the user and the service provider, and the second set of processing nodes is to generate the second transaction result based on the one or more parameters. In some implementations, the first set of processing nodes comprises a mutually exclusive set of processing nodes relative to the second set of processing nodes.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
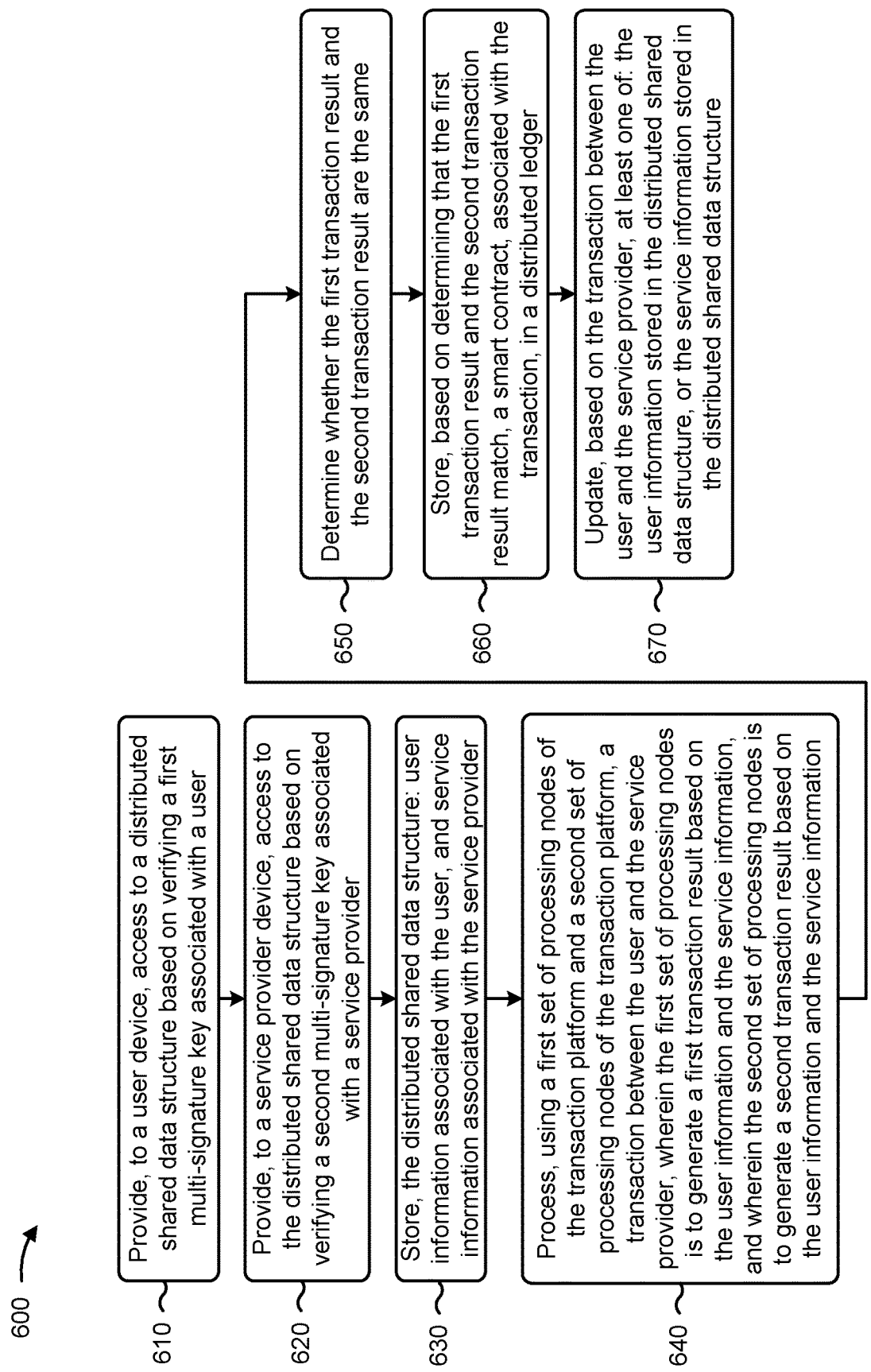
FIG. 6 is a flow chart of an example process for distributed transaction processing.

FIG. 6 is a flow chart of an example process 600 for distributed transaction processing. In some implementations, one or more process blocks of FIG. 6 may be performed by a transaction platform (e.g., transaction platform 230). In some implementations, one or more process blocks of FIG. 6 may be performed by another device or a group of devices separate from or including the transaction platform, such as a user device (e.g., user device 210), a service provider device (e.g., service provider device 220), one or more sensors (e.g., sensors 250), and/or the like.

As shown in FIG. 6, process 600 may include providing, to a user device, access to a distributed shared data structure, based on verifying a first multi-signature key associated with a user (block 610). For example, the transaction platform (e.g., using computing resource 234, processor 320, memory 330, storage component 340, input component 350, output component 360, communication interface 370, and/or the like) may provide, to a user device, access to a distributed shared data structure, based on verifying a first multi-signature key associated with a user, as described above.

As shown in FIG. 6, process 600 may include providing, to a service provider device, access to the distributed shared data structure, based on verifying a second multi-signature key associated with a service provider (block 620). For example, the transaction platform (e.g., using computing resource 234, processor 320, memory 330, storage component 340, input component 350, output component 360, communication interface 370, and/or the like) may provide, to a service provider device, access to the distributed shared data structure, based on verifying a second multi-signature key associated with a service provider, as described above.

As shown in FIG. 6, process 600 may include storing, in the distributed shared data structure, user information associated with the user, and service information associated with the service provider (block 630). For example, the transaction platform (e.g., using computing resource 234, processor 320, memory 330, storage component 340, input component 350, output component 360, communication interface 370, and/or the like) may store, in the distributed shared data structure, user information associated with the user, and service information associated with the service provider, as described above.

As shown in FIG. 6, process 600 may include processing, using a first set of processing nodes of the transaction platform and a second set of processing nodes of the transaction platform, a transaction between the user and the service provider, wherein the first set of processing nodes is to generate a first transaction result based on the user information and the service information, and wherein the second set of processing nodes is to generate a second transaction result based on the user information and the service information (block 640). For example, the transaction platform (e.g., using computing resource 234, processor 320, memory 330, storage component 340, input component 350, output component 360, communication interface 370, and/or the like) may process, using a first set of processing nodes of the transaction platform and a second set of processing nodes of the transaction platform, a transaction between the user and the service provider, as described above. In some implementations, the first set of processing nodes is to generate a first transaction result based on the user information and the service information. In some implementations, the second set of processing nodes is to generate a second transaction result based on the user information and the service information.

As shown in FIG. 6, process 600 may include determining whether the first transaction result and the second transaction result are the same (block 650). For example, the transaction platform (e.g., using computing resource 234, processor 320, memory 330, storage component 340, input component 350, output component 360, communication interface 370, and/or the like) may determine whether the first transaction result and the second transaction result are the same, as described above.

As shown in FIG. 6, process 600 may include storing, based on determining that the first transaction result and the second transaction result match, a smart contract, associated with the transaction, in a distributed ledger (block 660). For example, the transaction platform (e.g., using computing resource 234, processor 320, memory 330, storage component 340, input component 350, output component 360, communication interface 370, and/or the like) may store, based on determining that the first transaction result and the second transaction result match, a smart contract, associated with the transaction, in a distributed ledger, as described above.

As shown in FIG. 6, process 600 may include updating, based on the transaction between the user and the service provider, at least one of the user information stored in the distributed shared data structure, or the service information stored in the distributed shared data structure (block 670). For example, the transaction platform (e.g., using computing resource 234, processor 320, memory 330, storage component 340, input component 350, output component 360, communication interface 370, and/or the like) may update, based on the transaction between the user and the service provider, at least one of the user information stored in the distributed shared data structure, or the service information stored in the distributed shared data structure, as described above.

Process 600 may include additional implementations, such as any single implementation or any combination of implementations described below and/or in connection with one or more other processes described elsewhere herein.

In some implementations, the first multi-signature key is generated based on a first cryptographic identity associated with the user and a first private key associated with the user, and the second multi-signature key is generated based on a second cryptographic identity associated with the service provider and a second private key associated with the service provider. In some implementations, the transaction platform may receive the service information from at least one of the service provider device, or one or more sensors that are associated with a service that is to be provided, by the service provider, to the user. In some implementations, the first set of processing nodes comprises a mutually exclusive set of processing nodes relative to the second set of processing nodes.

In some implementations, the first set of processing nodes is to generate the first transaction result based on one or more parameters specified in a smart contract model that is associated with the transaction between the user and the service provider, and the second set of processing nodes is to generate the second transaction result based on the one or more parameters. In some implementations, when processing the transaction between the user and the service provider, the transaction platform may randomly select at least one of the first set of processing nodes from a plurality of processing nodes of the transaction platform or the second set of processing nodes from the plurality of processing nodes of the transaction platform, or the transaction platform may receive an instruction to select at least one of the first set of processing nodes from the plurality of processing nodes of the transaction platform or the second set of processing nodes from the plurality of processing nodes of the transaction platform.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A transaction platform, comprising:
one or more memories; and
one or more processors, communicatively coupled to the one or more memories, to:
provide, to a user device, access to a distributed shared data structure, based on verifying a first multi-signature key associated with a user;
provide, to a service provider device, access to the distributed shared data structure, based on verifying a second multi-signature key associated with a service provider;

store, in the distributed shared data structure:
　　user information associated with the user, and
　　service information associated with the service provider;
process, using a first set of processing nodes of the transaction platform and a second set of processing nodes of the transaction platform, a transaction between the user and the service provider,
　　wherein each respective processing node, of the first set of processing nodes, is to generate an intermediate transaction result based on one or more portions of the user information and one or more portions of the service information stored by that respective processing node,
　　　　wherein the one or more processors are to combine the intermediate transaction result from each respective processing node to generate a first transaction result, and
　　wherein the second set of processing nodes is to generate a second transaction result based on the user information and the service information;
determine whether the first transaction result and the second transaction result are the same; and
store, based on determining that the first transaction result and the second transaction result match, a smart contract, associated with the transaction, in a distributed ledger.

2. The transaction platform of claim 1, wherein the first set of processing nodes comprises a mutually exclusive set of processing nodes relative to the second set of processing nodes.

3. The transaction platform of claim 1, wherein the first set of processing nodes is to generate the first transaction result based on a smart contract model; and
　　wherein the second set of processing nodes is to generate the second transaction result based on the smart contract model.

4. The transaction platform of claim 1, wherein the first multi-signature key is generated based on:
　　a first cryptographic identity associated with the user, and
　　a first private key associated with the user; and
　　wherein the second multi-signature key is generated based on:
　　　　a second cryptographic identity associated with the service provider, and
　　　　a second private key associated with the service provider.

5. The transaction platform of claim 1, wherein the one or more processors are further to:
　　receive the service information from one or more sensors that are associated with a service that is to be provided, by the service provider, to the user.

6. The transaction platform of claim 1, wherein the one or more processors, when processing the transaction between the user and the service provider, are to:
　　randomly select the first set of processing nodes and the second set of processing nodes from a plurality of processing nodes of the transaction platform.

7. The transaction platform of claim 1, wherein the one or more processors, when processing the transaction between the user and the service provider, are to:
　　receive, from the user device, a first instruction to select the first set of processing nodes from a plurality of processing nodes of the transaction platform; and
　　receive, from the service provider device, a second instruction to select the second set of processing nodes from the plurality of processing nodes of the transaction platform.

8. A non-transitory computer-readable medium storing instructions, the instructions comprising:
　　one or more instructions that, when executed by one or more processors of a transaction platform, cause the one or more processors to:
　　　　provide, to a user device, access to a distributed shared data structure based on verifying a first multi-signature key associated with a user;
　　　　provide, to a service provider device, access to the distributed shared data structure based on verifying a second multi-signature key associated with a service provider;
　　　　store, in the distributed shared data structure:
　　　　　　user information associated with the user, and
　　　　　　service information associated with the service provider;
　　　　process, using a first set of processing nodes of the transaction platform and a second set of processing nodes of the transaction platform, a transaction between the user and the service provider,
　　　　　　wherein each respective processing node, of the first set of processing nodes, is to generate an intermediate transaction result based on one or more portions of the user information and one or more portions of the service information stored by that respective processing node,
　　　　　　　　wherein the one or more processors are to combine the intermediate transaction result from each respective processing node to generate a first transaction result, and
　　　　　　wherein the second set of processing nodes is to generate a second transaction result based on the user information and the service information;
　　　　determine whether the first transaction result and the second transaction result are the same;
　　　　store, based on determining that the first transaction result and the second transaction result match, a smart contract, associated with the transaction, in a distributed ledger; and
　　　　update, based on the transaction between the user and the service provider, the user information stored in the distributed shared data structure.

9. The non-transitory computer-readable medium of claim 8, wherein the user information comprises at least one of:
　　information identifying an identity of the user, or
　　information identifying one or more preferences, associated with the user, for a service provided by the service provider.

10. The non-transitory computer-readable medium of claim 9, wherein the one or more instructions, that cause the one or more processors to update the user information stored in the distributed shared data structure, cause the one or more processors to:
　　update the information identifying the one or more preferences, associated with the user, for the service provided by the service provider.

11. The non-transitory computer-readable medium of claim 8, wherein the service information comprises at least one of:
　　information identifying a service, associated with the transaction between the user and the service provider, that is to be provided to the user, information identifying one or more parameters for the service, or data that is generated while the service is being provided to the user.

12. The non-transitory computer-readable medium of claim 8, wherein the one or more instructions further cause the one or more processors to:

update, based on the transaction between the user and the service provider, the service information stored in the distributed shared data structure.

13. The non-transitory computer-readable medium of claim 8, wherein the first set of processing nodes is to generate the first transaction result based on one or more parameters specified in a smart contract model that is associated with the transaction between the user and the service provider; and wherein the second set of processing nodes is to generate the second transaction result based on the one or more parameters.

14. The non-transitory computer-readable medium of claim 8, wherein the first set of processing nodes comprises a mutually exclusive set of processing nodes relative to the second set of processing nodes.

15. A method, comprising:

providing, by a transaction platform and to a user device, access to a distributed shared data structure based on verifying a first multi-signature key associated with a user;

providing, by the transaction platform and to a service provider device, access to the distributed shared data structure based on verifying a second multi-signature key associated with a service provider;

storing, by the transaction platform and in the distributed shared data structure:

user information associated with the user, and service information associated with the service provider;

processing, by the transaction platform and using a first set of processing nodes of the transaction platform and a second set of processing nodes of the transaction platform, a transaction between the user and the service provider, wherein each respective processing node, of the first set of processing nodes, is to generate an intermediate transaction result based on one or more portions of the user information and one or more portions of the service information stored by that respective processing node, wherein the one or more processors are to combine the intermediate transaction result from each respective processing node to generate a first transaction result, and wherein the second set of processing nodes is to generate a second transaction result based on the user information and the service information;

determining, by the transaction platform, whether the first transaction result and the second transaction result are the same;

storing, by the transaction platform and based on determining that the first transaction result and the second transaction result match, a smart contract, associated with the transaction, in a distributed ledger; and updating, by the transaction platform and based on the transaction between the user and the service provider, at least one of:

the user information stored in the distributed shared data structure, or the service information stored in the distributed shared data structure.

16. The method of claim 15, wherein the first multi-signature key is generated based on:

a first cryptographic identity associated with the user, and a first private key associated with the user; and wherein the second multi-signature key is generated based on:

a second cryptographic identity associated with the service provider, and a second private key associated with the service provider.

17. The method of claim 15, further comprising:

receiving the service information from at least one of:

the service provider device, or one or more sensors that are associated with a service that is to be provided, by the service provider, to the user.

18. The method of claim 15, wherein the first set of processing nodes comprises a mutually exclusive set of processing nodes relative to the second set of processing nodes.

19. The method of claim 15, wherein the first set of processing nodes is to generate the first transaction result based on one or more parameters specified in a smart contract model that is associated with the transaction between the user and the service provider; and wherein the second set of processing nodes is to generate the second transaction result based on the one or more parameters.

20. The method of claim 15, wherein processing the transaction between the user and the service provider comprises at least one of:

randomly selecting at least one of:

the first set of processing nodes from a plurality of processing nodes of the transaction platform, or the second set of processing nodes from the plurality of processing nodes of the transaction platform, or receiving an instruction to select at least one of:

the first set of processing nodes from the plurality of processing nodes of the transaction platform, or the second set of processing nodes from the plurality of processing nodes of the transaction platform.

\* \* \* \* \*